United States Patent [19]
Vossen et al.

[11] Patent Number: 6,026,402
[45] Date of Patent: Feb. 15, 2000

[54] PROCESS RESTRICTION WITHIN FILE SYSTEM HIERARCHIES

[75] Inventors: Joseph K. Vossen, Deluth; Jeffrey S. Barber, Tucker, both of Ga.

[73] Assignee: Hewlett-Packard Company, Palo Alto, Calif.

[21] Appl. No.: 09/004,131

[22] Filed: Jan. 7, 1998

[51] Int. Cl.$^7$ ............................................. G06F 15/163
[52] U.S. Cl. ..................... 707/9; 707/10; 395/200.33; 395/200.47; 395/200.55; 395/200.59
[58] Field of Search ................................ 707/9, 10, 101, 707/102; 395/200.31, 200.47, 200.55, 200.59

[56] References Cited

U.S. PATENT DOCUMENTS

| | | | |
|---|---|---|---|
| 5,471,622 | 11/1995 | Eadline | 395/650 |
| 5,594,921 | 1/1997 | Pettus | 395/831 |
| 5,617,568 | 4/1997 | Ault et al. | 707/101 |
| 5,737,727 | 4/1998 | Lehmann et al. | 705/7 |
| 5,758,356 | 5/1998 | Hara et al. | 707/202 |
| 5,859,966 | 1/1999 | Hayman et al. | 713/200 |
| 5,867,647 | 2/1999 | Haigh et al. | 395/186 |
| 5,893,086 | 4/1999 | Schmuck et al. | 707/1 |

*Primary Examiner*—Jean R. Homere
*Attorney, Agent, or Firm*—Richard F. Shuette

[57] ABSTRACT

The present invention provides a method and apparatus for restricting a process or process hierarchy to a subset of a computer host's file system(s) in an environment where all file systems are simultaneously available to an application. A caller is provided with the ability to arrange for the restriction of a process hierarchy (consisting of a process and all the processes it may subsequently create) to a set of file system sub-hierarchies. When a process executes within a restriction domain in which a sub-hierarchy has been specified for each of the available file systems, an embodiment of the invention will modify the usual operation of the host computer's operating system interface such that any file system access attempts by the affected process are constrained to occur logically within the restriction domain.

11 Claims, 6 Drawing Sheets

PROCESS RESTRICTION WITHIN FILE SYSTEM HIERARCHIES

FIELD OF THE INVENTION

The present invention relates to methods and apparatus for restricting a process or process hierarchy to a subset of a host's file system(s) in an environment where all file systems are simultaneously available to an application.

BACKGROUND OF THE INVENTION

There exists a need for restricting a process or process hierarchy to a subset of a host's file system(s) in an operating system environment where all file systems are simultaneously available to an application.

Figure 1:
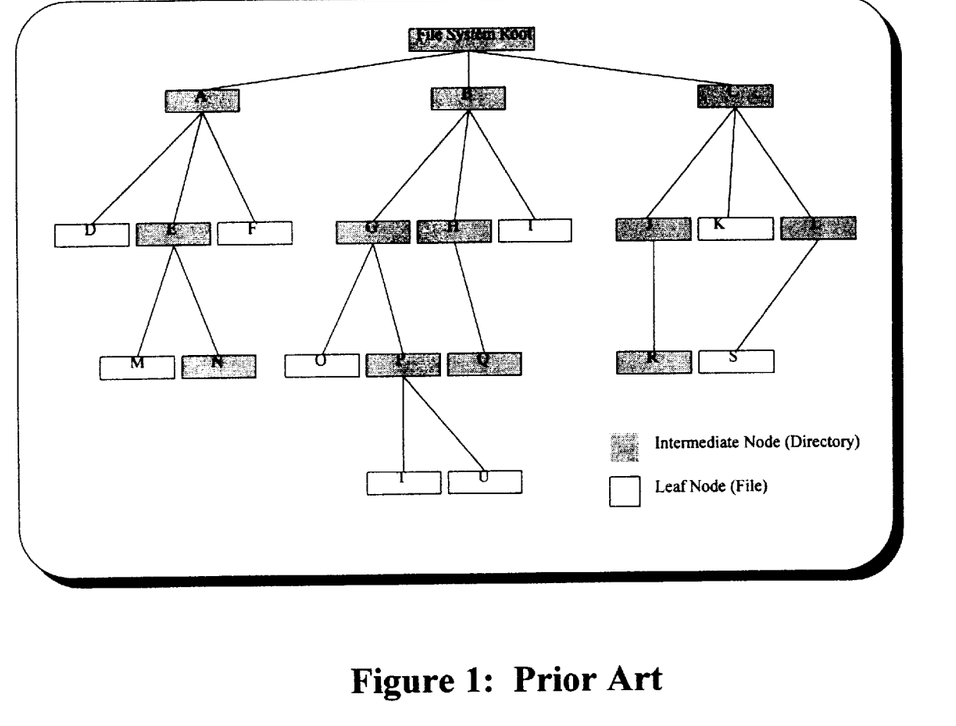
FIG. 1 depicts a diagram of the structure of a known hierarchical file system.
Figure 2:
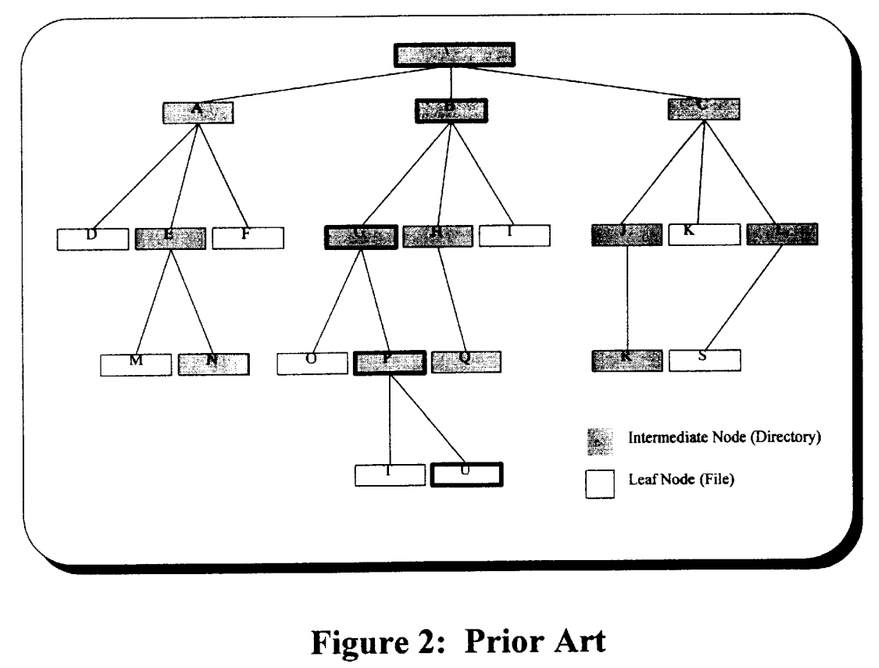
FIG. 2 depicts the correspondence of a file system path name with an ordered traversal of file system nodes "\B\G\P\U" within the file system depicted in FIG. 1.

Inasmuch as administration of modern computer systems is complex and error prone, and since errors in the specification of the systems' access control can lead to unauthorized disclosure or modification of information residing on that system, additional limitations on the computer system processes providing access to the information can be useful in reducing the danger of such inappropriate disclosure or modification. In particular, much information residing on networked computer systems is stored on fixed or removable electronic media structured as file systems, which provide a method of accessing the information to software agents executing on the same system. The access method provided by a typical file system provides a conceptual view of the storage media as a hierarchy shaped like an inverted tree. Each node in the hierarchy is either a leaf node—typically called a file and containing arbitrary stored information—or an intermediate node—called a directory and logically containing zero or more other files or directories (FIG. 1). Individual nodes are addressed by naming the particular file system and each of the file system nodes that must be traversed to reach the desired node within the hierarchy, starting from the root file system node. The combination of the file system name and a sequence of nodes uniquely identifies a particular file system node, and can be expressed in human-readable form as a path name describing the order of traversal from the root through each intermediate node to the leaf or intermediate node being accessed (FIG. 2).

In an operating system environment where multiple discrete file systems may be available for simultaneous access by processes, it would be desirable and of considerable advantage to provide a restriction mechanism that limits the portion of each file system that is accessible to each process as this serves to restrict the collection of information to which a given process might potentially have access.

Figure 3:
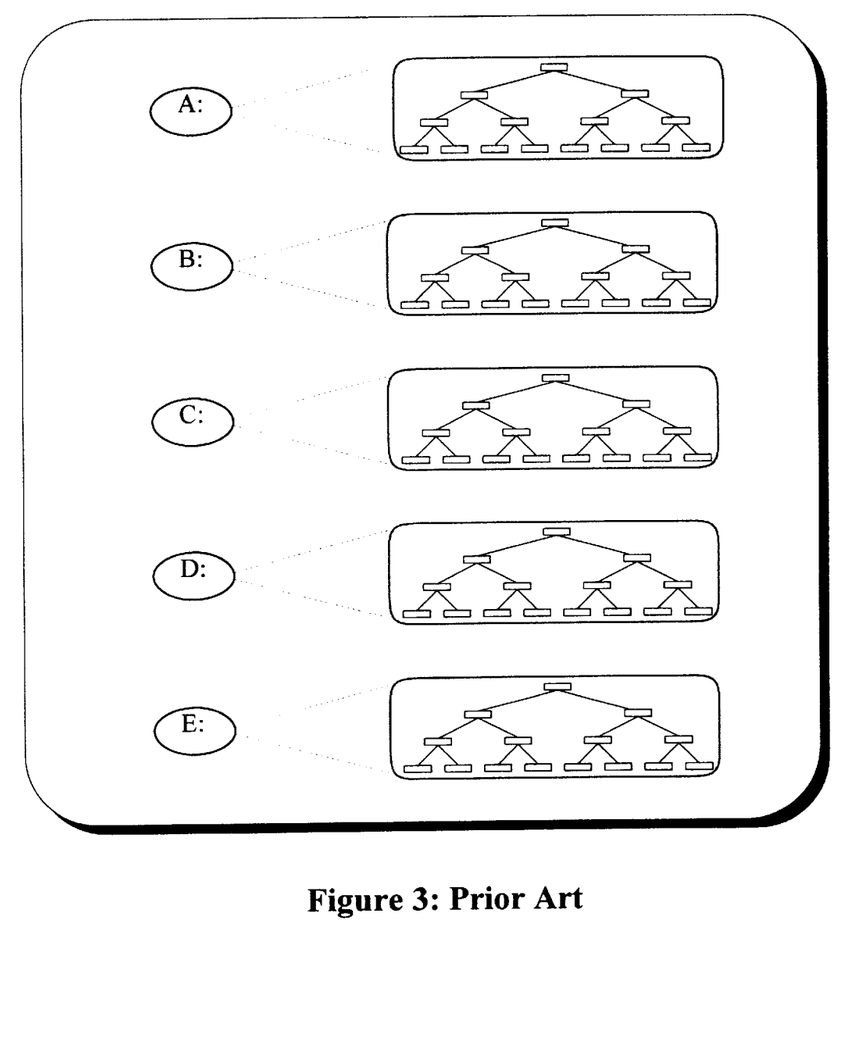
FIG. 3 depicts a process' view of the multiple file systems available to it in the file system structures described in FIG. 1 and FIG. 2.

Certain computer operating systems (in particular UNIX and its derivatives) have provided a feature that restricts a process and its descendant processes to a small portion of the file system hierarchy. These operating systems view the combination of all physical and logical file systems as a single tree-structured hierarchy. Other file systems beyond the first are overlaid on an existing node, replacing and usually extending the tree downward from that point. Some operating systems, however—exemplified by Microsoft Windows INT—provide simultaneous access to any number of file systems. While each of these file systems is itself considered a tree-structured hierarchy, user processes view each file system as a discrete, independently addressable collection of files (see FIG. 3).

It will be apparent from the foregoing that there is still a need for a method and apparatus for restricting a process or process hierarchy from the rest of a host's file system(s) in an environment where all file systems are simultaneously available to an application.

SUMMARY OF THE INVENTION

The present invention provides a method and apparatus for restricting a process or process hierarchy to a subset of a computer host's file system(s) in an environment where all file systems are simultaneously available to an application.

Accordingly, an embodiment of the invention provides a caller with the ability to arrange for the restriction of a process hierarchy (consisting of a process and all the processes it may subsequently create) to a set of file system sub-hierarchies. Each such sub-hierarchy consists of a portion of the file system identified by a single file system directory node together with all of the file system nodes subordinate to it within the file system, except that the sub-hierarchy may also be empty—that is, the sub-hierarchy for a given file system may contain no file system nodes. The domain to which a process hierarchy is restricted by the invention contains exactly one such sub-hierarchy corresponding to each file system or potential file system available to processes executing on the computer system. The restriction domain does not include other non-file system objects which may be made available by the host computer's operating system.

When a process executes within a restriction domain wherein a sub-hierarchy has been specified for each of the available file systems, an embodiment of the invention will modify the usual operation of the host computer's operating system interface such that any file system access attempts by the affected process are constrained to occur logically within the restriction domain. That is, such a process may access only those file system objects contained within the previously specified file system sub-hierarchies. Furthermore, the actual location of all accessible file system objects is hidden from such a process by the operating system. This is effectuated by causing the operating system to interpret file system path names (for such a process) such that the file system node specified as the root of the restriction sub-hierarchy is the apparent root of the entire file system hierarchy for that file system. In the case where the restriction domain contains an empty sub-hierarchy for a file system, the operating system is modified to simply disallow all attempts to access file system nodes residing on that file system.

DETAILED DESCRIPTION OF THE PREFERRED EMBODIMENTS

The present invention provides a method and apparatus for restricting a process or process hierarchy to a subset of a host's file system(s) in an environment where all file systems are simultaneously available to an application. Though similar mechanisms have been available in systems where all file systems are integrated into a single structure, no such facility is available in those systems where the file systems are kept logically separate. The present invention will describe the method and apparatus as incorporated into the Microsoft Windows NT operating system (hereinafter called simply "NT").

1. NT Operating System

NT is a computer operating system that provides an environment for the execution of general purpose programs, both interactive (with direct manipulation and control from a human user) and batch (running semi-autonomously with no direct user interaction).

As with many modern computer systems, a program on NT runs within the context of a process. The process is the active entity associated with a running program, possessing one or more threads of execution along with some amount of virtual memory and other resources. It is common to distinguish between the process, which is an embodiment of a running program, and the program itself—the file system object (or file) containing the instructions which guide the computer's execution. Each process in the system is assigned unique virtual memory space in which its own storage and control areas are maintained. The virtual memory space of each process is protected from arbitrary modification by other processes.

Processes have certain attributes, known as credentials, that reflect their ability to perform various specialized operations. The credentials reflect the identity of the user on whose behalf the process was initiated; for batch programs, this may reflect a pseudo-user identity assigned to processes operating on behalf of the operating system itself. Users are given different capabilities, based on their work requirements, level of trust by the computer's system administrator, and so forth. Trusted users or pseudo-users may be given privileges, which are specific rights that allow processes running on their behalf to execute various operations that might otherwise be forbidden by the operating system. Each privilege has a separate name and controls a separate set of operations.

A process on NT is always created by an existing process (except for the first process). In creating the new process, the existing process provides to the operating system a pointer to the program file containing the instructions to be executed in the new process context. Many attributes of the process, including the credentials described above, are inherited from the creating process.

Processes interact with the operating system and gain access to various media (hard disks, floppy disks, CD-ROM's, video displays, and so forth) through the use of system calls, which are simply sub-routine calls that pass control into the operating system context. The operating system then typically provides some service on behalf of the process, possibly transferring information into or out of the process' virtual memory space, before returning execution control to the process.

2. File System Access

When a process wishes to gain access to a file or other object, it executes a particular system call (NtCreateFile( )), providing, as one of its arguments a text string identifying the file. This text string is the file system path name identifying the file, as demonstrated in FIG. 2. The operating system traverses the indicated file system nodes to locate the file, then determines whether to provide access to the file by evaluating the credentials associated with the requesting process together with the security descriptor associated with the file. The security descriptor contains attributes describing which users or pseudo-users are permitted to access the file, and in what ways (obtain file contents, modify contents, or both).

When a process creates a new file, the procedure is almost identical, except that (1) the operating system checks only the existence (and security descriptors) of those file system nodes whose names precede the last component of the path name, and (2) the process and operating system cooperate to assign the contents of the security descriptor associated with the new file. At the completion of either the open or create operation, if the operation is permitted, the operating system returns a handle to the process. This handle is specific to the file object and is provided with nearly all future system calls that operate on that file to read information from or write information to it.

The present invention restricts sets of processes to particular file system sub-hierarchies, such that only those system calls that provide a path name—and hence, traverse file system nodes, like open or create—are of interest here.

3. File System Device Drivers

NT provides a mechanism whereby support for additional device and file system types can be added to the NT kernel. A device driver can be dynamically loaded on the command of an authorized system administrator. Essentially all NT external device support is structured as independently loadable device drivers. The operating system kernel delivers one of a large set of requests to the driver in a I/O Request Packet (or IRP) when a process requests some service of the device. The driver then uses various kernel-provided functions along with its own specific knowledge of the device to fulfill the request. When the operation is completed, the driver notifies the kernel that it has finished the request.

Device drivers can be transparently layered atop one another. Each driver provides the same interface to the component above it as it uses in the component below it. A driver can dynamically identify the devices it wishes to layer above and attach to the device to insert itself in the driver stack above the device. Hence, while a device appears to processes as a single object, its operation may actually be implemented by a stack of device drivers each contributing semantics to the overall interface.

Figure 5:
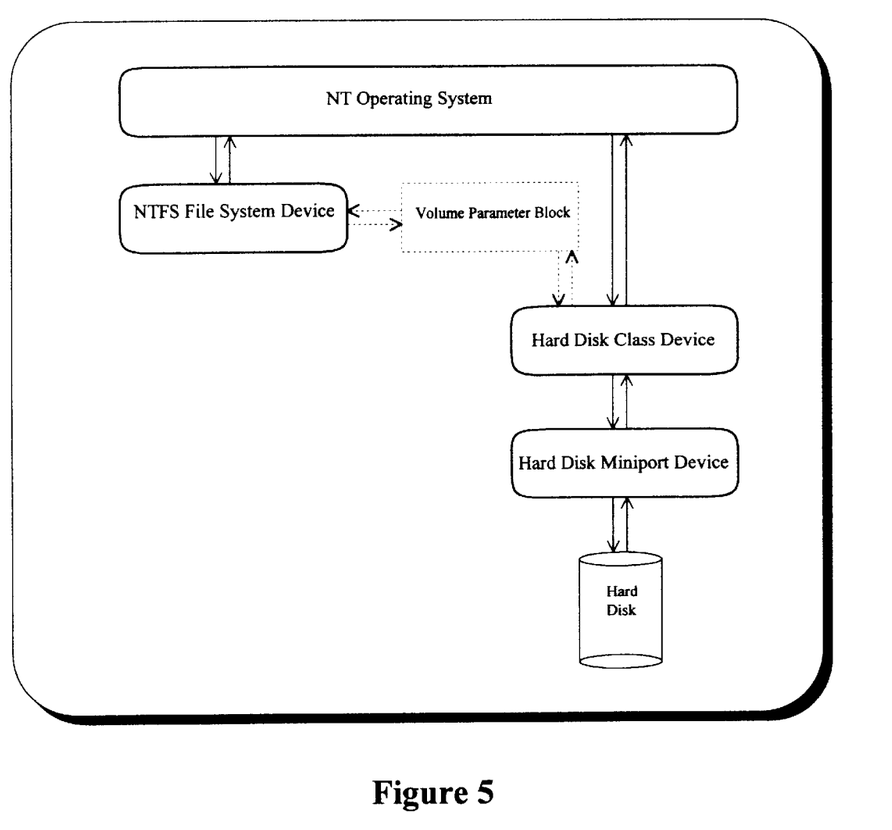
FIG. 5 depicts and NT system configuration for support of a file system affected by the invention.

File systems are also implemented as device drivers. File system device drivers support a slightly different interface than other drivers, but the basic structure and many of the mechanisms supporting the two types are identical. A file system driver expects to have a more traditional device logically below it, offering access to some type of secondary storage device containing the actual storage space occupied by the file system abstraction. The file system driver does not however actually attach to the media device. Instead, it arranges to associate itself with the media device through use of a volume parameter block (VPB), which is a structure recognized by the upper layers of the NT operating system kernel. FIG. 5 demonstrates a typical NT system configuration for the support of a file system.

Figure 6:
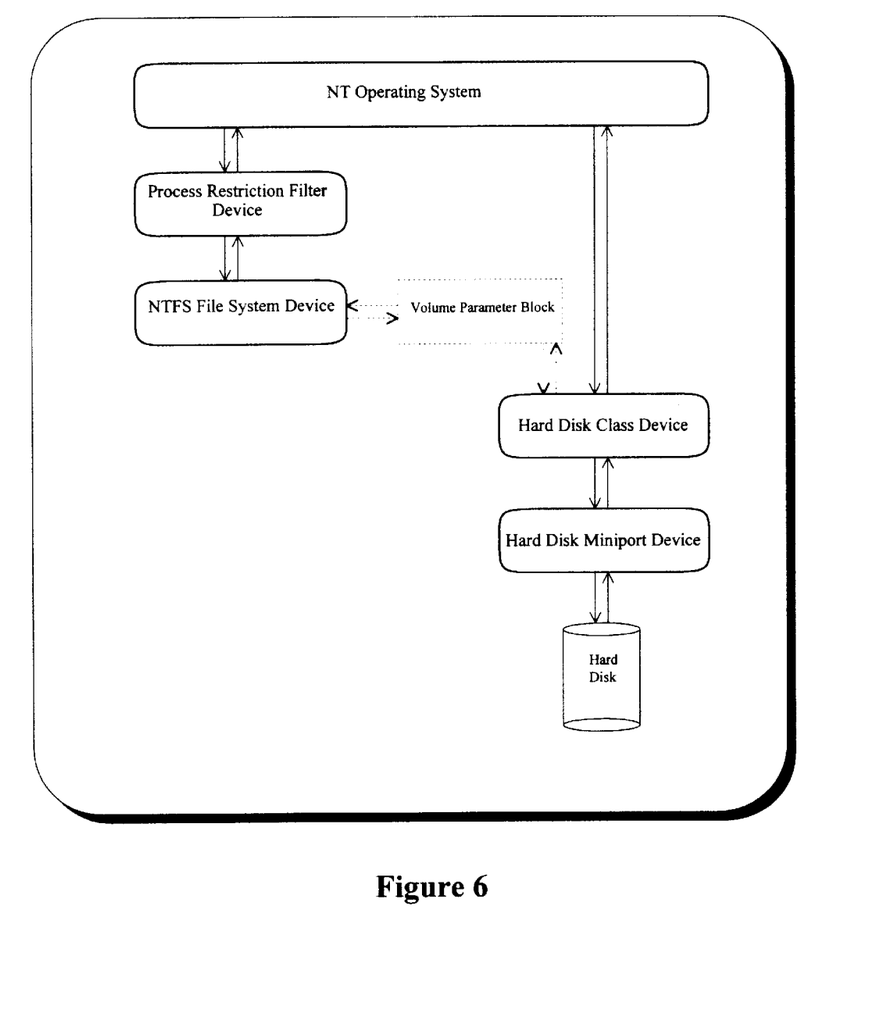
FIG. 6 depicts an NT system configuration including a process restriction filter driver.

It is possible, though less common, to add layers above file system driver s as well. Such an intermediate driver is then known as a file system filter driver since its usual task is to filter the requests delivered to the underlying file system driver. A filter driver will typically examine the IRP provided by the kernel and make modifications (according to the function of the specific driver) before passing it along to the actual file system driver. The preferred embodiment of the invention is implemented as such a driver, and is labeled in the figures as the Process Restriction Filter Driver (see FIG. 6).

When processing a full path name provided by a process, the kernel scans the initial portion of the path name to identify the particular device on which the file system resides. This device is represented by a device object created by and under the control of a media device driver (typically a hard disk driver). The remainder of the path name is interpreted by the file system driver. If there were no Volume Parameter Block, the kernel would reject the request because of the additional path name components appended to the device name. However, the presence of the VPB alerts the kernel that a file system is mounted on the device. The rest of the path name is then passed to the file system device for interpretation.

NT supports a number of different file system types including NTFS (New Technology File System), FAT (File Allocation Table), CDFS (CD-ROM File System) and HPFS (High Performance File System). All interpret path names in the same way and present a similar interface to the NT kernel, however, and so the present invention is able to provide process-based file system restrictions for all file system types.

4. Process Restriction Filter Driver Loading and Attachment

All NT device drivers require a standard initialization routine in order to be loaded. The name of a driver's initialization entry point is defined as DriverEntry( ). After the driver is loaded into memory, the I/O Manager invokes the driver's initialization entry point with two parameters providing (1) a pointer to a driver object which represents the driver, and (2) a pointer to a Unicode string that specifies the path to the driver's registry key.

The driver object is a data structure automatically created by the kernel to represent each driver loaded. It provides a focal point for driver activity and a communication path between the kernel and the driver. Registry keys are indices into the NT configuration database. Any tuning or configuration variables provided by the driver can be specified in the database by the administrator. There are no keys of interest to the present invention.

The filter driver initialization function fills in the remainder of the driver object, acquires any system resources that are needed for processing I/O requests, and creates a master device object. The master device object is linked into the system's object directory, where it provides visibility to the driver for user programs. This device can be opened by ordinary user programs and—through the DeviceIoControl( ) facility—provides a communication path into the driver. As discussed later, this is how the actual file system restrictions are established.

If the initialization of the driver is successful, then the DriverEntry( ) routine returns a status of STATUS_SUCCESS; otherwise, an error is returned and the NT kernel automatically unloads the driver. The dispatch table within the driver object is initialized. Since the process restriction filter driver deals with a small subset of the IRP major functions, the routines defined by the dispatch table will point to the same function and this dispatch routine will use the major function code within the IRP to determine the type of processing to perform.

The FastIoDispatch member of the driver object will be set to a table of functions that define the fast I/O routines that are handled by the process restriction filter driver. The process restriction filter driver must support every function within the fast I/O dispatch table since a file system filter driver must support all of the fast I/O functions defined for any drivers that are layered below it. Since the process restriction filter driver may be layered above any defined file system, it is prudent to support all of the fast I/O functions.

Before returning to the kernel driver loader, the process restriction filter driver must insert itself in the I/O execution path for all devices currently holding a file system—i.e., it must attach itself to the driver that is currently at the top of the driver stack that deals with each file system. This is accomplished in the following manner:

1. The I/O configuration is obtained by invoking the function IoGetConfigurationInformation( ). The information returned in the I/O configuration structure that it provides is the number of hard disks, floppy drives, and CD-ROM's that are configured in the system.
2. For every hard disk drive configured in the system, the following actions are taken:
    1. A partition table is allocated within non-paged pool space using ExAllocatePool( ).
    2. The partition table is read. The partition table is located at the beginning of each disk; whose name is \Device\HarddiskX\Partition( ), where X is a number from zero (0) to the count of hard disks configured in the system minus one (1). The partition table is read from the disk by formulating an IRP and issuing it to the underlying file system driver. The partition table contains the number of partitions that have been created for that disk. Each partition has the potential to contain a file system. The partitions on the hard disk are named \Device\HarddiskX\PartitionY, where X represents a disk configured in the system and Partition Y represents the actual partition. As noted above, Partition( ) represents the entire disk. Partition1 thru PartitionN are the partitions on the hard disk that could represent file systems.
    3. Each partition table that exists on the hard disk is processed by:
        1. A path name that references the root directory is created. This path name is formatted as: \Device\HarddiskX\PartitionY\.
        2. The root directory is opened using ZwCreateFile( ).
        3. The handle returned from ZwCreateFile( ) is used to obtain a file object pointer by calling ObReferenceObjectByHandle( ).
        4. The file object returned is used to obtain the associated device object by calling IoGetRelatedDeviceObject( ). This device object typically represents the file system itself, though it is conceivable that another filter driver has already attached itself to the file system device.
        5. A device object is created for the process restriction filter driver by invoking IoCreateDevice( ).
        6. The device extension for the process restriction filter device object is initialized by saving a back pointer to the device object itself and a pointer to the device object that is associated with the file system obtained from IoGetRelatedDeviceObject( ).
        7. The process restriction filter device object is attached to the next driver in the chain (the file system device itself in the absence of any other filter driver) by calling the IoAttachDeviceByPointer( ) function.
        8. The file object pointer that was created by the call to ObReferenceObjectByHandle( ) is released by calling ObDereferenceObject( ).
        9. The handle to the root directory that was returned from the call to ZwCreateFile( ) is released by calling ZwClose( ).
3. For every floppy disk or CD-ROM drive configured in the system, the following actions are taken:
    1. A path name that references the root directory on the device is created. This path name appears as \Device\floppyX\ for floppy disks or \Device\cdromX (where X is the respective drive number of the floppy or CD-ROM device.
2. An attempt is made to open the root directory using ZwCreateFile( ).
3. If unsuccessful because no media is present or unformatted media is present in the device, the driver goes on to the next device.
4. If the open fails for any other reason, the driver bugchecks the system (shuts down the operating system) since no other failures are anticipated.
5. Otherwise, the handle returned from ZwCreateFile( ) is used to obtain a file object pointer by calling ObReferenceObjectByHandle( ).
6. The file object returned is used to obtain the associated device object by calling IoGetRelatedDeviceObject( ). This device object typically represents the file system itself, though it is conceivable that another filter driver has already attached itself to the file system device.
7. A device object is created for the process restriction filter driver by invoking IoCreateDevice( ).
8. The device extension for the process restriction filter device object is initialized by saving a back pointer to the device object itself and a pointer to the device object that is associated with the file system (obtained from IoGetRelatedDeviceObject( ).
9. The process restriction filter device object is attached to the next driver in the chain (the file system device itself in the absence of any other filter driver) by calling the IoAttachDeviceByPointer( ) function.
10. The file object pointer that was created by the call to ObReferenceObjectByHandle( ) is released by calling ObDereferenceObject( ).
11. The handle to the root directory that was returned from the call to ZwCreateFile( ) is released by calling ZwClose( ).
4. The buffer that was acquired for the partition table is released by calling ExFreePool( ).

Once the driver has installed itself as a handler above all existing file systems, it then arranges to detect the mounting of any new file system—this typically occurs if a user inserts new media into a floppy or CD-ROM drive, or connects a new network drive.

5. For non-network file systems, the process restriction filter driver layers itself above (attaches to) the standard file system named device objects. These include "\ntfs", "\cdfs", "\fat", and "\hpfs". These named devices are the ones called on to mount new instances of the respective file system types. If one of these doesn't exist, this indicates the corresponding driver isn't (yet) loaded. To detect when such file system drivers are loaded, the driver calls the NT function IoRegisterFsRegistrationChange( ), providing it with the address of a function that will be called when a new file system driver is loaded, and its driver calls the IoRegisterFilesystem( ) function. If and when a new file system driver is loaded, the process restriction filter driver is notified by the operating system of the new driver. It then layers itself above that device as well by attaching its own device object to the new file system device.

When the driver detects an IRP requesting the mount of a file system (via its own device attached to the file system driver's named device object), it passes the IRP along to the underlying file system driver after arranging for its own function to be called as an I/O Completion routine. When the file system driver has completed the process of mounting the media as a file system, the operating system will arrange to call the process restriction filter at a previously given address. This permits the filter to execute again after the file system driver has had the opportunity to create its file system-specific device object representing the newly mounted file system. The filter then layers itself above this device by creating a new device object of its own and attaching it to the file system device's object.

In order to detect and handle the restriction of network "drives" that may be connected by users to remote shares (either at the time the filter is installed or at some later time), the filter will create another device object and attach it to the NT redirector file system device "\Device\LanmanRedirector". Since all requests to access so-called redirected drives go through this one device, there is no need to detect and handle mounts as with file systems representing physical media.

5. Process Restriction State

In order to maintain the state of a process with respect to the process restriction driver described herein, it is necessary to create and manage a set of data structures in association with each process to which the restrictions are applied. By having a unique set of data structures for each process, the state of each process can be separately controlled.

The data structures associated with a process ultimately originate from a SetProcessRootDirectories( ) call applied to that process or one of its ancestors. This function is described in more detail in later sections but, briefly, it provides the path name of a file system hierarchy within which the calling process should be restricted for one or more file systems. The file system hierarchy for each designated file system is completely unrelated to the path specified for other file systems.

In concept, the process state data structures can be considered a list of pairs, consisting of a file system specifier and the corresponding path name designation. Only those file systems provided in the SetProcessRootDirectories( ) call are stored in the data structure. The data structure provides the path to which the associated process is contained within that file system only. Each data structure is contained in storage space allocated by the process restriction driver. It is indexed by process ID, though conceptually it can be considered part of the respective process' resources.

Figure 4:
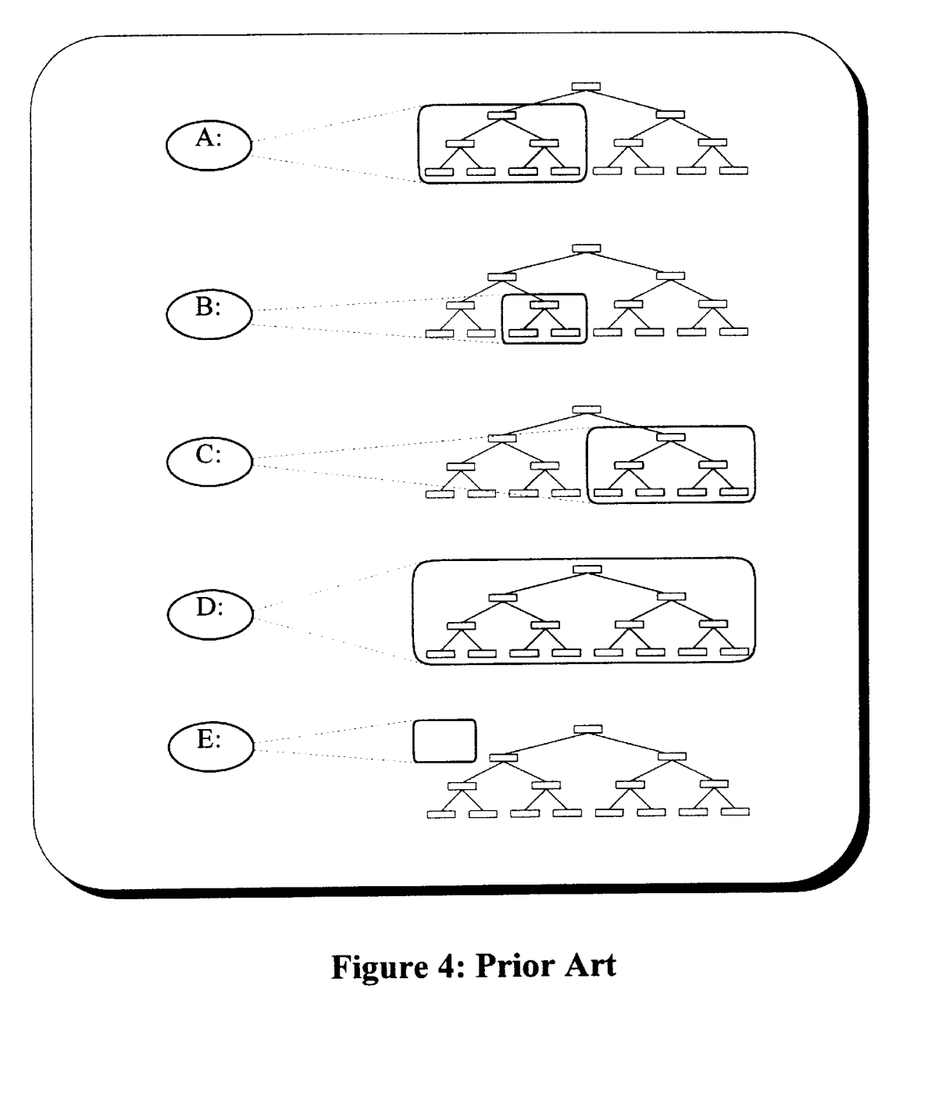
FIG. 4 illustrates five apparent file system hierarchies after process restriction in accordance with the invention.

Any file system not specified in the above call is implicitly assigned a null hierarchy. That is, if a file system does not appear in the list provided to SetProcessRootDirectories( ), the process restriction filter driver will prevent all access to that file system. This is depicted in FIG. 4, where a null hierarchy is associated with the file system labeled E:.

The process state data structures are inherited by subsequently executed processes. If a process is running under a restricted set of file system hierarchies, and that process initiates another process, the process state data structures must be copied from the old process to the new one. In order to make this copy, the driver must be able to detect when a new process is created. The NT kernel provides a mechanism whereby another component can register to receive notification of such an event. The driver will call PsSetCreateProcessNotifyRoutine( ) to register itself for the notification.

When the notification function is called, the process restriction filter will identify the old process, locate the state data structures associated with it, allocate memory for a new set of data structures, and copy the contents of the old set to the new. The process restriction filter will then insert the new set of file system hierarchies into its data structure list using the new process ID as a key.

The process state is conceptually a list of pairs, each pair consisting of a device and a restriction hierarchy to apply to that device. In implementation, the device is actually described in one of two ways, depending on whether the file system is a remote file system provided by the network redirector, or a local file system backed by physical media. Since each local file system is uniquely identified by its own file system device object, the corresponding object created by the process restriction filter driver is sufficient to distinguish the device. However, some file systems apply to removable media, which may be dismounted and later remounted. To guard against the possible accidental re-use of another file system device object at the same address as that used by a previous instance, the filter driver assigns a serial number to each device. When file system restrictions are imposed against a process, the serial number of each respective file system device is recorded in the process state data structures. For remote file systems provided by the redirector, all remote file systems are provided through the same device object. Hence, the process restriction filter must store an additional piece of information to distinguish one "drive" or file system from another. When the drive is connected, the user provides a drive name (F:, G:, etc.). This drive name is passed as the first component of file path names to the redirector on I/O requests referring to the remote file system. For example, if a user connects drive F: to the share[1] named "stuff" on a remote computer system named "quinn", all path names referencing objects on F: begin with the string "\Device\LanmanRedirector\F:\quinn\stuff".

[1] A share is the term used to describe the file system hierarchy made available for export to other systems.

The filter will detect situations in which it is being asked to restrict a process within a network file system by the simple expedient of recognizing that the request has been sent through the device object corresponding to the redirector file system ("\Device\LanmanRedirector"). Then, it will retrieve the name associated with the specified hierarchy and parse it, assuming that the name is structured as in the example above: drive name (with a colon) followed by host computer name and share name. Then, the device object along with the initial path name including the drive name, host and share name forms the "file system identifier" for that file system.

NT also supports a capability of specifying remote files via a UNC (Universal Naming Convention) name. In a UNC name, no connected drive is used; instead, the host system and share names are specified directly in the path name, without a drive name (i.e. \Device\LanmanRedirector\quinn\stuff\ . . . ). The process restriction filter will not support the specification of file system hierarchies via UNC names. Processes already operating with file system restrictions will be prevented from opening remote objects specified via UNC names.

6. Process Restriction I/O Processing

Once the process restriction file system filter is installed, it receives all I/O requests destined for physical file systems. The driver examines every IRP that is passed to determine if any processing is needed. The only major I/O function codes (aside from IRP_MJ_FILE_SYSTEM_CONTROL, which provides the file system mounting capability through the IRP_MN_MOUNT_VOLUME sub-function code) that need to be handled are IRP_MJ_CREATE, IRP_MJ_QUERY_INFORMATION, and IRP_MJ_SET_INFORMATION.

In concept, the process restriction filter operates by examining all IRPs containing path names sent to each file system it restricts. If the calling process is operating in the restricted mode, the root of the restriction hierarchy for the respective file system is simply prepended to all file names before the IRP is passed on to the next file system driver in the device driver stack.

The I/O Manager forwards I/O requests (IRPs) to the driver's dispatch entry point. For each IRP received, the filter driver determines if the process that initiated the I/O request should be subject to file system restrictions. Since the I/O request is being performed in the context of the process that initiated the I/O request, an object handle to the current process is obtained by invoking the IoGetCurrentProccess( ) function. The returned process object pointer is used as a key to retrieve the data structures recording that process' file system restriction state. If there is no state for this process (no data structures are associated with the process), then no restrictions are required for the calling process, and the IRP is simply passed to the next file system driver in the chain.

If the process is operating in the restricted mode, the retrieved data structures record the list of logical device/hierarchy pairs describing the restrictions. The driver searches the list by examining each entry. If the device to which the current request is directed matches the device object in the list entry, and (for non-network file systems) the serial number for the device object matches the serial number of the device at the time the restrictions were imposed, the entry is considered to match the current device and further filtering operations are perform using the restriction hierarchy path name recorded in the list entry.

A function code of IRP_MJ_CREATE in the IRP indicates that the process wants to open an existing, or create a new, file system object. The IRP_MJ_CREATE could also specify that the process wants to perform a volume open, which the process restriction filter driver does not care about. The latter case is distinguished in one of two ways: (1) the FileName field from the FileObject field specified in the IRP contains a null (zero) pointer, or (2) the FO_DIRECT_DEVICE_OPEN flag is set in the Flags field of the FileObject specified in the IRP. In either of these cases, the IRP is simply passed on to the next driver in the stack without further processing.

Once the process restriction filter driver has determined that the filtering operation should be applied to the I/O request, the file object is checked to see if the I/O request is relative to another directory or file that is already open. The checks for a valid relative I/O request are:

1. The file object contains a valid related file object. This is indicated by the RelatedFileObject member of the file object being non-zero.
2. The related file object specifies that the I/O type is for a file system object. This is indicated by the Type member of the related file system object set to IO_TYPE_FILE.
3. The related file object must contain a pointer to a valid path name. This is indicated by the buffer pointer in the Unicode string specified by FileName being non-zero.

If the request is determined to be relative to another open file or directory, the IRP is simply passed on to the next driver in the device stack without modification. Otherwise, the FileName parameter in the IRP is replaced with the address of a new memory buffer allocated by the process restriction filter driver. A new path name is assembled in the buffer by appending the previous value indicated by the FileName parameter to the path name of the process restriction hierarchy associated with the device. Note that if the input FileName path string was equal to "\" (the root directory), it need not be appended to the process restriction hierarchy path name.

After the IRP has been modified as described, the IRP is passed to the driver that resides below the process restriction filter driver. The manner in which this is accomplished is described below.

If the function code in the IRP is IRP_MJ_SET_INFORMATION and the request class is FileLinkInformation or FileRenameInformation (as specified in the Parameters. QueryDirectory.FileInformationClass field), then the IRP is being used to specify a new file or directory name for a rename or file link operation. In this case, the new name must be processed using the same algorithm as specified above for the IRP_MJ_CREATE command.

If the function code is IRP_MJ_QUERY_INFORMATION and the request class is FileNameInformation, the inverse of the above operation must be done. In this case, an application is asking the driver for the name of the file associated with an open file handle. The process restriction driver maintains its transparency to applications by removing the process restriction hierarchy path from the path name returned to the application. Since the actual file system driver must be allowed to execute before the process restriction filter can get involved, the operation must be broken into two steps.

The filter marks the current IRP pending. Then, it formulates a separate new IRP, the contents of which are copied from the current IRP. It submits this secondary IRP to the underlying file system, after arranging for its own procedure to be called as an I/O Completion routine. When the underlying file system has satisfied the request to retrieve the path name associated with the requested file system object, it causes the IRP to be completed, resulting in the invocation of the filter driver's completion routine. This routine transfers the path name provided by the actual file system driver into the original IRP, removing the initial portion of the path name corresponding to the restriction hierarchy path.

7. Detaching the Process Restriction Filter

Since some file systems are built on media that may be removed by the user at any time, the process restriction filter driver watches for an indication that the underlying media has been removed or replaced. If so, the operating system calls a particular entry point in the Fast I/O dispatch table instructing the filter to detach itself from the operating system. Once this is done, a new file system may be mounted on the same media device.

When this new file system is mounted, the process restriction filter will layer itself above the new file system device instance as described earlier. Note that the new device object built by the filter driver will be initialized with a new serial number so that it will be distinct from the first file system.

8. External Interfaces

There is only a single interface to the process restriction filter that is visible to programs executing outside of the operating system kernel. This is the interface that permits a program to set up the list of file system restrictions for itself and its successor processes.

The SetProcessRootDirectories( ) function is used to modify the apparent root directories of all file system devices for the caller and all descendants:
BOOL
SetProcessRootDirectories
(ULONG ulCount; LPCTSTR ppRootDirs[ ]);
where:
ulCount indicates the number of strings in ppRootDirs.
ppRootDirs is an array of path names. Each path name contains a Win32$^2$-format drive name (X:) and a full path corresponding to the new root directory (the restriction hierarchy) for that file system device.

Win32 is the standard application program interface and provides a slightly different apparent file system organization than the native NT interface described throughout the rest of this document.

This function sets a new root directory for each file system device represented by one of the paths in ppRootDirs. Following the execution of this call, any subsequent path references to a file system specified in one of these paths is actually interpreted relative to the new root directory specified here.

The process' notion of its current directory on each file system device is set to the path specified as the new root (the top of the restriction hierarchy). The process' notion of its current drive is set to the file system indicated by the first path in ppRootDirs. Access to any file system device not appearing in the directory list is denied following this call, as is access to any remote file system via a UNC (Universal Naming Convention) path. If more than one of the path names in ppRootDirs refers to the same file system device, the first one encountered will become the new root directory for that file system.

Each path specification must refer to an actual directory to which the caller has FILE_TRAVERSE access. If a process (or one of its ancestors) has already executed SetProcessRootDirectories( ), all of the path names specified are interpreted relative to the current root directories on the respective file systems.

The return value is True if the function is successful; False, otherwise. In the event of a failure, the GetLastError( ) function may be consulted for more detailed status.

Any existing handles to files or directories outside the new root directory are not affected by this call, only new handles and other accesses made via path names.

Example:
PTCHAR root_dir=_TEXT("C:\TEST-DIR\");
PTCHAR config_file=_TEXT("C:\TEST-APP\Test.CFG");
DWORD attrs;
SetProcessRootDirectories(1, &root_dir);
attrs=GetFileAttributes(config_file);

In this example, it is the attributes of "C:\TEST-DIR\TEST-APP\Test.CFG" that will actually be assigned to attrs. Following the SetProcessRootDirectories( ) call, it is not possible for the caller to obtain a new handle or refer by name to any file on the file system device outside the new "root" hierarchy.

While the invention has been described with respect to various specific examples and embodiments thereof, it is to be understood that the invention is not limited thereto and that it can be variously practiced within the scope of the following claims.

What is claimed is:

1. A method for restricting a process or set of processes to a subset of a host computer system's file systems, comprising the steps of:

providing a host computer system within which multiple processes operate; each process having simultaneous access to multiple, discrete, hierarchically-organized file systems, permitting a privileged process, operating on behalf of a specially authorized user, to designate sub-hierarchies within one or more of the available file systems, changing the behavior of the host system such that for each such file system sub-hierarchy assigned to a process, the process is prevented from accessing or even addressing any file system objects outside the assigned sub-hierarchy in the respective file system, and changing the behavior of the host system such that, after the assignment of such sub-hierarchies to a process, the restriction is also assigned to and enforced against any further process it subsequently creates.

2. A method for restricting a process or set of processes to a subset of a host computer system's file systems in an environment where many discrete file systems may be simultaneously accessible to the processes as claimed in claim 1, further comprising creating and managing a set of data structures in association with each process to which the restrictions are applied such that each process can be separately controlled, wherein, subsets of file system hierarchies are simultaneously specified in a system call to identify which process or processes are to be restricted.

3. A method for restricting a process or set of processes to a subset of a host computer system's file systems as claimed in claim 2, the system call further comprising, a SetProcessRootDirectrories( ) call applied to an identified process, wherein, the file system hierarchy for each designated file system is completely unrelated to the path specified for other file systems.

4. The method for restricting a process or set of processes to a subset of a host computer system's file systems as claimed in claim 3, further comprising a restricted domain to which a process hierarchy is restricted and contains exactly one such sub-hierarchy corresponding to each file system or potential file system available to processes executing on the computer system.

5. The method for restricting a process or set of processes to a subset of a host computer system's file systems as set forth in claim 4, wherein, when a process executes within a restriction domain in which a sub-hierarchy has been specified for each of the available file systems, any file system access attempts by the affected process are constrained to occur logically within the restriction domain, wherein, a process may access only those file system objects contained within the previously specified file system sub-hierarchies.

6. The method for restricting a process or set of processes to a subset of a host computer system's file systems as set forth in claim 5, further comprising the method steps of:

hiding the actual location of all accessible file system objects from the affected process by causing the operating system to interpret file system path names (for such a process) such that the file system node specified as the root of the restriction sub-hierarchy is the apparent root of the entire file system hierarchy for that file system, and wherein, if the restriction domain contains an empty sub-hierarchy for a file system, the operating system is modified to simply disallow all attempts to access file system nodes residing on that file system.

7. The method for restricting a process or set of processes to a subset of a host computer system's file systems as set forth in claim 5, the method further comprising the step of, before returning to the kernel driver loader, the process restriction filter driver inserting itself in the I/O execution path for all devices currently holding a file system—i.e., it must attach itself to the driver that is currently at the top of the driver stack that deals with each file system.

8. A method for restricting a process or set of processes to a subset of a host computer system's file systems in an environment where many discrete file systems may be simultaneously accessible to the processes as claimed in claim 1, further comprising the step of inheriting restrictions by subsequently created processes in which a new set of data structures are created by copying the data structures of the creator, and wherein the new set of data structures is maintained in association with the new process such that the new process is subjected to the same restrictions as its creator.

9. A method for restricting a process or set of processes in which the process state is conceptually a list of pairs, each pair consisting of a device and a restriction hierarchy to apply to that device, wherein another component can register to receive notification of such an event, comprising the method steps of:

calling PsSetCreateProcessNotifyRoutine( ) to register itself for the notification, identifying a first process, locating a first set of state data structures associated with the first process, allocating memory for a new set of data structures, copying the contents of first set of state data structures to the new set of data structures, wherein, the new of data structures are inserted into the first set of data structures using the new process ID as a key, distinguishing the device, further comprising the steps of:

identifying each local file system by its own file system device object as the corresponding object created by the process restriction filter driver is sufficient to distinguish the device, and identifying removable media file systems by assigning a serial number to each device such that when file system restrictions are imposed against a process, the serial number of each respective file system device is recorded in the process state data structures.

10. A method for restricting a process or set of processes on remote file systems provided by the redirectors as claimed in claim 9, further comprising:

storing an additional piece of information on the process restriction filter to distinguish one "drive" or file system from another, and further comprising the step of, when the drive is connected, the user provides a drive name (F:, G:, etc.); and passing the drive name, as the first component of file path names, to the redirector on I/O requests referring to the remote file system.

11. A method for restricting a process or set of processes on remote file systems provided by the redirectors as claimed in claim 10, further comprising the step of the filter detecting situations in which it is being asked to restrict a process within a network file system by recognizing that the request has been sent through the device object corresponding to the redirector file system ("\Device\LanmanRedirector"), and retrieving the name associated with the specified hierarchy, and parsing the name as follows: drive name (with a colon) followed by host computer name and share name, wherein the device object along with the initial path name including the drive name, host and share name forms the "file system identifier" for that file system.

* * * * *

UNITED STATES PATENT AND TRADEMARK OFFICE
CERTIFICATE OF CORRECTION

PATENT NO. : 6,026,402
DATED : February 15, 2000
INVENTOR(S) : Joseph K. Vossen et al.

It is certified that error appears in the above-identified patent and that said Letters Patent is hereby corrected as shown below:

<u>Title page, Item [54] and Column 1, lines 1-2,</u>
Delete "PROCESS RESTRICTION WITHIN FILE SYSTEM HIERARCHIES" and insert therefor -- A METHOD FOR RESTRICTING A PROCESS OR PROCESS HIERARCHY TO A SUBSET OF A HOST'S FILE SYSTEM --

<u>Column 14,</u>
Line 24, after "wherein, the new" insert -- set --

Signed and Sealed this

Twenty-second Day of October, 2002

*Attest:*

*Attesting Officer*

JAMES E. ROGAN
*Director of the United States Patent and Trademark Office*